(12) United States Patent
Li

(10) Patent No.: US 11,144,366 B2
(45) Date of Patent: Oct. 12, 2021

(54) COMPUTING NODE PROCESSOR RESOURCE OPTIMIZATION METHOD, COMPUTING NODE AND SERVER CLUSTER

(71) Applicant: LENOVO (BEIJING) LIMITED, Beijing (CN)

(72) Inventor: Dong Li, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 105 days.

(21) Appl. No.: 16/489,477

(22) PCT Filed: Sep. 22, 2017

(86) PCT No.: PCT/CN2017/102943
§ 371 (c)(1),
(2) Date: Aug. 28, 2019

(87) PCT Pub. No.: WO2018/157586
PCT Pub. Date: Sep. 7, 2018

(65) Prior Publication Data
US 2020/0050498 A1    Feb. 13, 2020

(30) Foreign Application Priority Data
Feb. 28, 2017  (CN) .......................... 201710114044.0

(51) Int. Cl.
*G06F 9/50*    (2006.01)
*G06F 9/48*    (2006.01)

(52) U.S. Cl.
CPC .............. *G06F 9/5094* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/5027;
(Continued)

(56) References Cited

U.S. PATENT DOCUMENTS

| | | | |
|---|---|---|---|
| 7,254,812 B1* | 8/2007 | Menezes | G06F 9/485 |
| | | | 713/320 |
| 2016/0034309 A1 | 2/2016 | Egner et al. | |
| 2016/0266916 A1* | 9/2016 | Morelli | G06F 9/5077 |

FOREIGN PATENT DOCUMENTS

| | | |
|---|---|---|
| CN | 104239520 A | 12/2014 |
| CN | 104317658 A | 1/2015 |

(Continued)

OTHER PUBLICATIONS

He Li, "Study on Load Scheduling Problem in Parallel Systems", China Doctoral Dissertations Full-text Database, Dec. 31, 2009, p. 5, 24, 26, fig 3.2 Total 5 pages.
(Continued)

*Primary Examiner* — Charles M Swift
(74) *Attorney, Agent, or Firm* — Anova Law Group, PLLC

(57) ABSTRACT

A computing node processor resource optimization method, a computing node, and a server cluster are provided. A standard processor computing power is used as a reference to acquire a relative computing power of a processor in the computing node. Based on the relative computing power, a relative computing resource of the computing node is determined. The relative computing resource of the processor in each computing node is acquired based on a uniform reference. The computing power in the computing nodes having the same number of the processor cores multiplied by the number of the threads per processor core may be distinguished, such that the task load distributed to each computing node can match the computing power of the computing
(Continued)

Acquiring a relative computing power of a processor in a computing node with respect to a computing power of a standard processor — S101

Based on the relative computing power, determining a relative computing resource of the computing node — S102 node. Thus, the computing resource of the processor in each computing node may be fully utilized, thereby improving the computing efficiency of the big data computing platform.

10 Claims, 1 Drawing Sheet

(52) U.S. Cl.
CPC .......... *G06F 9/4843* (2013.01); *G06F 9/4881* (2013.01); *G06F 9/50* (2013.01); *G06F 9/505* (2013.01); *G06F 9/5027* (2013.01); *G06F 9/5044* (2013.01); *G06F 9/5061* (2013.01); *G06F 9/5077* (2013.01); *G06F 9/5083* (2013.01); *G06F 2209/501* (2013.01)

(58) Field of Classification Search
CPC ...... G06F 9/5044; G06F 9/505; G06F 9/5061; G06F 9/5077; G06F 9/5083; G06F 9/5094
See application file for complete search history.

(56) References Cited

FOREIGN PATENT DOCUMENTS

| CN | 106095586 A | 11/2016 |
|---|---|---|
| CN | 106874120 A | 6/2017 |

OTHER PUBLICATIONS

The World Intellectual Property Organization (WIPO) International Search Report for PCT/CN2017/102943 dated Dec. 7, 2017 5 Pages (including translation).

He Li; "Study on Load Scheduling problem in Parallel System", China Doctoral Dissertations Full-Text Database, Dec. 31, 2009, pp. 5, 24 and 26 Total 84 Pages.

* cited by examiner

COMPUTING NODE PROCESSOR RESOURCE OPTIMIZATION METHOD, COMPUTING NODE AND SERVER CLUSTER

CROSS-REFERENCES TO RELATED APPLICATIONS

This application is a national phase entry under 35 U.S.C. § 371 of International Application No. PCT/CN2017/102943, filed on Sep. 22, 2017, which claims the priority of Chinese Patent Application No. 201710114044.0, filed with the State Intellectual Property Office of P. R. China on Feb. 28, 2017, the entire contents of which are incorporated herein by reference.

FIELD OF THE DISCLOSURE

The present disclosure generally relates to the field of processor technology and, more particularly, relates to a computing node processor resource optimization method, a computing node and a server cluster.

BACKGROUND

A big data computing platform is a cluster including a plurality of computing nodes (e.g., computers or servers). The big data computing platform distributes computing tasks to the plurality of computing nodes based on computing resources of processors in the computing nodes, where the processor computing resource=number of processor cores*number of threads per processor core.

The big data computing platform distributes same computing task loads to computing nodes having same processor computing resources. For example, a processor includes four processor cores and eight threads. Computing node A and computing node B include the same number of the processors having the four processor cores and the eight threads. That is, the processor computing resources in the computing node A and the computing node B are both 8. The big data computing platform will distribute equal computing task loads to the computing node A and the computing node B. The processor in the computing node A may execute the corresponding computing tasks at a processor utilization rate of about 90%. The processor in the computing node B may execute the corresponding computing tasks at a processor utilization rate of about 10%.

Because the big data computing platform treats the computing nodes having the same processor computing resources as the computing nodes having equal computing powers, the computing nodes similar to the computing node B may not be fully utilized, thereby reducing an overall computing efficiency of the big data computing platform.

BRIEF SUMMARY OF THE DISCLOSURE

The present disclosure provides a computing node processor resource optimization method, a computing node, and a server cluster to overcome the problem in the existing technology that the computing resource of the processors in the computing nodes cannot be fully utilized causing an overall computing efficiency degradation of the big data computing platform.

One aspect of the present disclosure provides a computing node processor resource optimization method. The method includes: acquiring a relative computing power of a processor in a computing node with respect to a computing power of a standard processor; and based on the relative computing power, determining a relative computing resource of the computing node.

Optionally, acquiring the relative computing power of the processor in the computing node with respect to the computing power of the standard processor includes: based on a processor computing model, acquiring an actual computing power of the processor in the computing node; and based on the actual computing power and the computing power of the computing power of the standard processor, acquiring the relative computing power of the processor in the computing node, where the computing power of the standard processor is acquired based on the processor computing model.

Optionally, acquiring the computing power of the standard processor is determined based on pre-set parameters configured for the processor computing model.

Optionally, determining the relative computing resource of the computing node based on the relative computing power includes: acquiring a ratio of the actual computing power of the processor in the computing node over the computing power of the standard processor; and determining the ratio to be the relative computing power of the processor in the computing node.

Optionally, determining the relative computing resource of the computing node based on the relative computing power includes: based on the ratio and a quantity of the processors in the computing node, determining the relative computing resource of the computing node.

Another aspect of the present disclosure provides a computing node. The computing node includes: a memory configured to store a computing power of a standard processor; a processor configured to acquire a relative computing power of the processor in the computing node with respect to the computing power of the standard processor and to determine a relative computing resource of the computing node based on the relative computing power; and a communication bus configured to connect the processor with the memory.

Optionally, acquiring the relative computing power of the processor in the computing node with respect to the computing power of the standard processor includes: based on a processor computing model, acquiring an actual computing power of the processor in the computing node; and based on the actual computing power and the computing power of the computing power of the standard processor, acquiring the relative computing power of the processor in the computing node, wherein the computing power of the standard processor is acquired based on the processor computing model.

Another aspect of the present disclosure provides a server cluster. The server cluster includes a plurality of computing nodes. At each computing node, determining a relative computing resource of the computing node includes: acquiring a relative computing power of a processor in the computing node with respect to a computing power of a standard processor; and based on the relative computing power, determining the relative computing resource of the computing node.

Optionally, the server cluster further includes: a load balancer configured to distribute task loads for the plurality of computing nodes based on the relative computing resources of the plurality of computing nodes.

Optionally, acquiring the relative computing power of the processor in the computing node with respect to the computing power of the standard processor includes: based on a processor computing model, acquiring an actual computing power of the processor in the computing node; and based on the actual computing power and the computing power of the computing power of the standard processor, acquiring the relative computing power of the processor in the computing node, wherein the computing power of the standard processor is acquired based on the processor computing model.

The present disclosure provides a computing node processor resource optimization method. In the embodiments of the present disclosure, the standard processor computing power is used as a reference to acquire the relative computing power of the processor in the computing node with respect to the computing power of the standard processor. Based on the relative computing power, the relative computing resource of the computing node is determined. As such, the computing resource of the processor in each computing node is normalized. That is, the relative computing resource of the processor in each computing node is acquired based on a uniform reference. In the process of distributing the tasks, the computing power in the computing nodes having the same number of the processor cores multiplied by the number of the threads per processor core may be distinguished, such that the task load distributed to each computing node can match the computing power of the computing node. Thus, the computing resource of the processor in each computing node may be fully utilized, thereby improving the computing efficiency of the big data computing platform.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION

Figure 1:
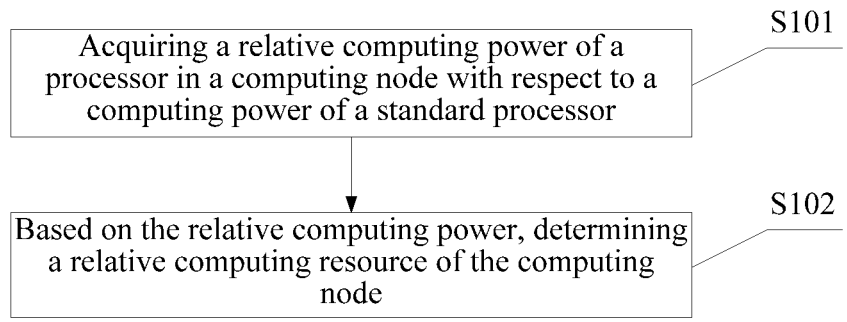
FIG. 1 illustrates a flowchart of an example of a computing node processor resource optimization method according to some embodiments of the present disclosure.

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

The terminology used herein is for the purpose of describing the embodiments of the present disclosure and is not intended to limit the present disclosure. The words "a", "an", and "the" include the meaning of "a plurality of" and "the plurality of" unless indicated otherwise in the context. In addition, the words "including" and "comprising", etc. are used to indicate the presence of the described features, steps, operations and/or components, but do not exclude the presence or addition of one or more other features, steps, operations or components.

All terms (including technical and scientific terms) used herein have the meaning commonly understood by one of ordinary skill in the art, unless defined otherwise. It should be noted that the terms used herein be interpreted as having a meaning consistent with the context of the specification and should not be interpreted in an ideal or overly rigid manner.

Where an expression similar to "at least one of A, B, and C, etc." is used, it should generally be interpreted in accordance with the meaning of the expression as commonly understood by one of ordinary skill in the art (for example, "a system including at least one of A, B, and C" shall include, but is not limited to, systems including A alone, B alone, C alone, A and B, A and C, B and C, and/or A and B and C, etc.) Where an expression similar to "at least one of A, B, or C, etc." is used, it should generally be interpreted in accordance with the meaning of the expression as commonly understood by one of ordinary skill in the art (for example, "a system including at least one of A, B, or C, etc." shall include, but is not limited to, systems including A alone, B alone, C alone, A and B, B and C, A and C, and/or A and B and C, etc.) Those skilled in the art will also appreciate that transitional conjunctions and/or phrase arbitrarily representing two or more optional items, whether in the specification, claims, or drawings, is to be construed as the possibility of any one of the optional items or any combination of the optional items. For example, the phrase "A and/or B" should be interpreted as including the possibility of "A alone", "B alone", or "A and B".

Some block diagrams and/or flowcharts are shown in the drawings. It should be understood that some blocks or combinations of the blocks in the block diagrams and/or flowcharts can be implemented by computer program instructions. The computer program instructions may be provided to a general-purpose computer, a special-purpose computer, or a processor of other programmable data processing devices, such that the instructions being executed by the processor may be used to implement the functions/operations illustrated in the block diagrams and/or flowcharts.

Therefore, the technical solution of the present disclosure may be implemented in hardware and/or software (including firmware and microcode, etc.). In addition, the technical solution of the present disclosure may be a computer program product in the form of a computer readable medium storing instructions. The computer program product may be used in an instruction execution system or in combination with the instruction execution system. In the context of the present disclosure, the computer readable medium may be any medium that may contain, store, transmit, broadcast, or transport instructions. For example, the computer readable medium may include, but is not limited to, electrical, magnetic, optical, electromagnetic, infrared, or semiconductor system, device, component, or transmission medium. Examples of the computer readable medium includes: a magnetic storage device, such as a magnetic tape or hard disk (HDD); an optical storage device, such as an optical disk (CD-ROM); a memory, such as a random-access memory or a flash memory; and/or a wired/wireless communication link.

FIG. 1 illustrates a flowchart of an example of a computing node processor resource optimization method according to some embodiments of the present disclosure. As shown in FIG. 1, the method includes the following process.

Operation S101: Acquiring a Relative Computing Power of a Processor in a Computing Node with Respect to a Computing Power of a Standard Processor.

The standard processor may be a processor in any computing node in a cluster including a plurality of computing nodes or may be a processor in a computing node not in the cluster including the plurality of computing nodes.

The standard processor may be a physically existing processor, or a virtual processor identified by computing performance parameters.

The computing performance parameters may include, for example, integer calculation information, float point number calculation information, or multimedia instruction set, etc.

The integer calculation information refers to an execution efficiency of integer calculation instructions, such as the number of integer instructions that can be executed in one second. The float point number calculation information refers to the execution efficiency of float point number calculation instructions, such as the number of float point number instructions that can be executed in one second.

The multimedia instruction set identifies the execution efficiency of the processor that relies on instructions to calculate and control a system. Each processor comes with an instruction system coupling with the hardware circuits thereof, which is defined at a design stage. Strength of the multimedia instruction set is an important parameter of the processor. The multimedia instruction set is one of the most effective tools to improve the processor efficiency. In the current mainstream architecture, the multimedia instruction set can be divided into two categories: complex instruction set computing (CISC) and reduced instruction set computing (RISC).

Operation S102: Based on the Relative Computing Power, Determining a Relative Computing Resource of the Computing Node.

The present disclosure provides a computing node processor resource optimization method. In the embodiments of the present disclosure, the standard processor computing power is used as a reference to acquire the relative computing power of the processor in the computing node with respect to the computing power of the standard processor. Based on the relative computing power, the relative computing resource of the computing node is determined. As such, the computing resource of the processor in each computing node is normalized. That is, the relative computing resource of the processor in each computing node is acquired based on a uniform reference. In the process of distributing the tasks, the computing power in the computing nodes having the same number of the processor cores multiplied by the number of the threads per processor core may be distinguished, such that the task load distributed to each computing node can match the computing power of the computing node. Thus, the computing resource of the processor in each computing node may be fully utilized, thereby improving the computing efficiency of the big data computing platform.

In the embodiments of the present disclosure, the relative computing power of the processor in the computing node with respect to the computing power of the standard processor may be acquired in more than one way, which includes, but is not limited to, the following examples.

In one example, acquiring the relative computing power of the processor in the computing node with respect to the computing power of the standard processor includes the following process. The actual computing power of the processor in the computing node may be acquired based on a processor computing model. Based on the actual computing power and the computing power of the standard processor, the relative computing power of the processor in the computing node may be acquired. The computing power of the standard processor is acquired based on the processor computing model.

The processor computing model is configured to measure the computing power of the processor in the computing node. For example, the computing power of the processor in the computing node may be measure by completing certain tasks. The measurement may be performed at an application program client terminal, such as wPrime, which measures the computing power of the processor in the computing node through computing prime numbers.

If the standard processor is the physically existing processor in the computing node, the processor computing model may be installed in the computing node. Then, the processor computing model may be executed in the computing node to acquire the computing power of the processor in the computing node.

If the standard processor is not the physically existing processor in the computing node, pre-set parameters for the standard processor, such as the aforementioned computing performance parameters, may be entered into the processor computing model. Based on the parameters of the standard processor, the computing power of the standard processor may be acquired. That is, the computing power of the standard processor is determined based on the pre-set parameters configured into the processor computing model.

In the embodiments of the present disclosure, based on the actual computing power and the computing power of the standard processor, the relative computing power of the processor in the computing node with respect to the computing power of the standard processor may be acquired in more than one way, which includes, but is not limited to, the following examples.

In one example, acquiring the relative computing power of the processor in the computing node with respect to the computing power of the standard processor based on the actual computing power and the computing power of the standard processor includes the following process. A ratio of the actual computing power of the processor in the computing node over the computing power of the standard processor is acquired. The ratio is determined to be the relative computing power of the processor in the computing node.

For example, the actual computing power of the processor in the computing node is 53.28 GFlops. That is, 53.28 G float point instructions may be executed in one second. The computing power of the standard processor is 50 GFlops. That is, 50 G float point instructions may be executed in one second. The ratio of the actual computing power of the processor in the computing node over the computing power of the standard processor is approximately 53.28 GFlops/50 GFlops=1.0656.

In the embodiments of the present disclosure, based on the relative computing power, the relative computing resource of the processor in the computing node may be determined in more than one way, which includes, but is not limited to, the following examples.

Based on the ratio and the quantity of the processors in the computing node, the relative computing resource of the computing node may be determined.

In one embodiment, the product of the ratio and the quantity of the processors in the computing node is determined to be the relative computing resource of the computing node.

The relative computing resource of the computing node=the ratio*the quantity of the processors.

Assuming that the ratio is 1.0656 and the quantity of the processors is 4, the relative computing resource of the computing node is 1.0656*4=4.2624.

Because the computing power of the standard processor is known, the optimal task load distributed to the computing node is also known. The relative computing power of the computing node is with respect to the standard processor. Thus, the optimal task load distributed to each computing node may be precisely determined.

The computing node processor resource optimization method may also include acquiring the product of the ratio and the standard task load of the standard processor, where the product is the task load corresponding to the computing node.

In another example, acquiring the relative computing power of the processor in the computing node with respect to the computing power of the standard processor includes: based on the processor computing model, acquiring the actual computing power of the computing node; and based on the actual computing power of the computing node, acquiring the relative computing power of the computing node, where the computing power of the standard processor is acquired based on the processor computing model.

In one embodiment, based on the actual computing power of the computing node and the computing power of the standard processor, acquiring the relative computing power of the computing node includes: acquiring the ratio of the actual computing power of the computing node over the computing power of the standard processor; and determining the ratio to be the relative computing power of the computing node.

In one embodiment, based on the relative computing power, determining the relative computing resource of the computing node includes: determining the ratio to be the relative computing resource of the computing node.

Other features of the embodiment are similar to the previously described embodiments and will not be repeated herein.

Figure 2:
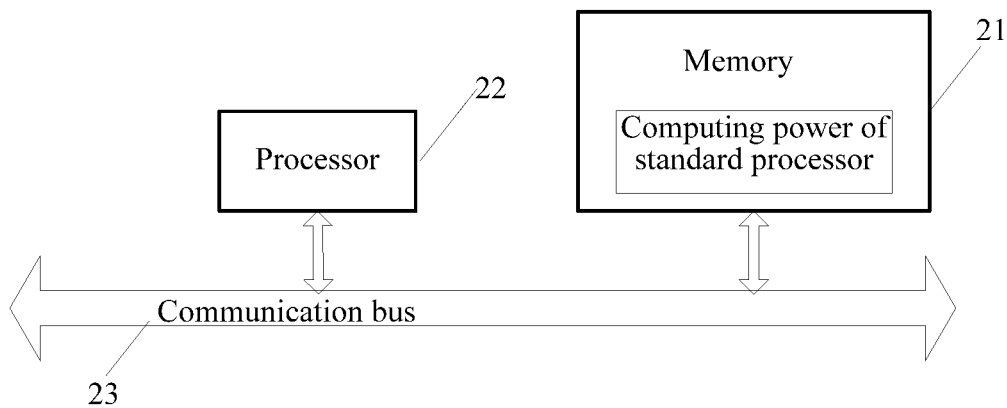
FIG. 2 illustrates a schematic diagram of an example of a computing node according to some embodiments of the present disclosure.

The present disclosure also provides a computing node to which the computing node processor resource optimization method is applied. FIG. 2 illustrates a schematic diagram of an example of a computing node according to some embodiments of the present disclosure.

The computing node may be a server or other electronic device.

As shown in FIG. 2, the computing node includes: a memory 21 configured to store the computing power of the standard processor, a processor 22 configured to acquire the relative computing power of the processor in the computing node with respect to the computing power of the standard processor and to determine the relative computing resource of the computing node based on the relative computing power, and a communication bus 23. The processor 22 and the memory 21 are connected through the communication bus 23.

The processor 22 may be a central processing unit (CPU), an application specific integrated circuit (ASIC), or one or more integrated circuits configured to implement the embodiments of the present disclosure.

The memory 21 may include high speed random-access memory (RAM) or a non-volatile memory, such as at least one magnetic disk memory.

In one embodiment, acquiring by the processor 22 the relative computing power of the processor of the computing node with respect to the computing power of the standard processor includes: based on the processor computing model, acquiring the actual computing power of the processor in the computing node; and based on the actual computing node and the computing node of the standard processor, acquiring the relative computing power of the processor in the computing node, where the computing power of the standard processor is acquired based on the processor computing model.

In one embodiment, the computing power of the standard processor is determined based on the pre-set parameters configured for the processor computing model.

In one embodiment, acquiring by the processor 22 the relative computing power of the processor in the computing node based on the actual computing power and the computing power of the standard processor includes: acquiring the ratio of the actual computing power of the processor in the computing node over the computing power of the standard processor; determining the ratio to be the relative computing power.

In one embodiment, determining by the processor 22 the relative computing resource of the computing node based on the relative computing power includes: based on the ratio and the quantity of the processors in the computing node, determining the relative computing resource of the computing node.

Figure 3:
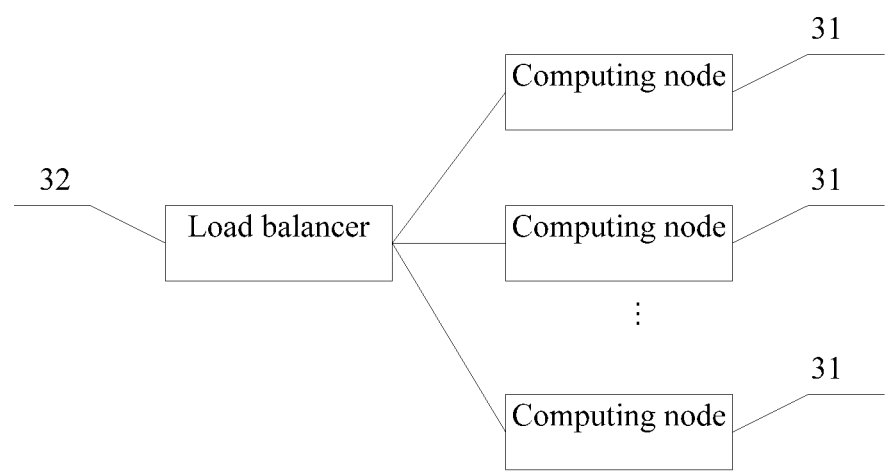
FIG. 3 illustrates a schematic diagram of an example of a server cluster according to some embodiments of the present disclosure.

The present disclosure also provides a server cluster. FIG. 3 illustrates a schematic diagram of an example of a server cluster according to some embodiments of the present disclosure. As shown in FIG. 3, the server cluster includes: a plurality of computing nodes 31. At each computing node, determining the processor resource of itself includes: acquiring the relative computing power of the processor of itself with respect to the computing power of the standard processor; and based on the relative computing power, determining the relative computing resource of itself.

In one embodiment, the server cluster also includes: a load balancer 32 configured to distribute task loads for the computing nodes based on the relative computing resources of the computing nodes.

In one embodiment, the task load may be distributed to each computing node based on the standard task load corresponding to the standard processor and the relative computing resource of the computing node.

In one embodiment, at each computing node, acquiring the relative computing power of the processor of the computing node with respect to the computing power of the standard processor includes: based on the processor computing model, acquiring the actual computing power of the processor in the computing node; and based on the actual computing power and the computing node of the standard processor, acquiring the relative computing power of the processor in the computing node, where the computing node of the standard processor is acquired based on the processor computing model.

In one embodiment, the computing power of the standard processor is determined based on the pre-set parameters configured for the processor computing model.

In one embodiment, at each computing node, acquiring the relative computing power of the processor in the computing node based on the actual computing power and the computing power of the standard processor includes: acquiring the ratio of the actual computing power of the processor in the computing node over the computing power of the standard processor; and determining the ratio to be the relative computing power.

In one embodiment, at each computing node, determining the relative computing resource of the computing node based on the relative computing power includes: based on the ratio and the quantity of the cores of the processors in the computing node, determining the relative computing resource of the computing node.

Those skilled in the art may appreciate that the various features described in the embodiments and/or the claims of the present disclosure may be combined or integrated in many ways, even if such combinations or integrations are not described in the specification. In particular, various combinations and/or integrations of the features described in the embodiments and/or the claims of the present disclosure can be made without departing from the spirit and scope of the present disclosure. All such combinations and/or integrations shall fall within the scope of the present disclosure.

It should be noted that the embodiments of the present disclosure are described in a progressive manner, and each embodiment focuses on differences from other embodiments. The same or similar parts between the embodiments can be mutually referred to with each other.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A computing node processor resource optimization method, comprising:
    acquiring an expected computing power of a computing node in terms of a number of standard float point instructions per second by determining a quantity of processors, a number of cores per processor, and a number of threads per processor core in the computing node;
    acquiring an actual processing load of float point instructions per second for the computer node;
    acquiring a relative computing power of the processors in the computing node by seeking a ratio of the actual processing load to the expected computing power in the computing node; and
    based on the relative computing power, determining a relative computing resource of the computing node.

2. The method according to claim 1, wherein acquiring the actual processing load of float point instructions per second for the computer node includes:
    based on a processor computing model, acquiring an actual computing power of the processor in the computing node; and
    based on the actual computing power and the computing power of the computing power of the standard processor, acquiring the relative computing power of the processor in the computing node, the computing power of the standard processor being based on the processor computing model.

3. The method according to claim 2, wherein:
    the computing power of the standard processor is determined based on parameters configured for the processor computing model.

4. A computing node, comprising:
    a memory configured to store an expected computing power in the computer node in terms of a number of standard float point instructions per second by determining a quantity of processors, a number of cores per processor, and a number of threads per processor core in the computing node;
    acquiring an actual processing load of floating point instructions per second for the computer node;
    the processors configured to acquire a relative computing power of the processors in the computing node by seeking a ratio of the actual processing load to the expected computing power in the computing node and to determine a relative computing resource of the computing node based on the relative computing power; and
    a communication bus configured to connect the processor with the memory.

5. The computing node according to claim 4, wherein the processor is further configured to:
    based on a processor computing model, acquire an actual processing load of floating point instructions per second for the computer node as an actual computing power of the processors in the computing node; and
    based on the actual computing power and the computing power of the computing power of the standard processor, acquire the relative computing power of the processor in the computing node, the computing power of the standard processor being based on the processor computing model.

6. A server cluster, comprising a plurality of computing nodes, wherein:
    at each computing node, determining a relative computing resource of the computing node includes:
    acquiring an expected computing power of a computing node in terms of a number of standard float point instructions per second by determining a quantity of processors, a number of cores per processor, and a number of threads per processor core in the computing node;
    acquiring an actual processing load of float points instructions per second for the computer node;
        acquiring a relative computing power of the processor in the computing node by seeking a ratio of the actual processing load to the expected computing power in the computing node; and
        based on the relative computing power, determining the relative computing resource of the computing node.

7. The server cluster according to claim 6, further including:
    a load balancer configured to distribute task loads for the plurality of computing nodes based on the relative computing resources of the plurality of computing nodes.

8. The server cluster according to claim 6, wherein acquiring the relative computing power of the processor in the computing node with respect to the computing power of the standard processor includes:
    based on a processor computing model, acquiring an actual computing power of the processor in the computing node; and
    based on the actual computing power and the expected computing power of the standard processor, acquiring the relative computing power of the processor in the computing node, the computing power of the standard processor being based on the processor computing model.

9. The computing node according to claim 5, wherein:
    the computing power of the standard processor is determined based on parameters configured for the processor computing model.

10. The server cluster according to claim 7, wherein the relative computing resources of the plurality of computing nodes are determined based on the relative computing resource of each of the computing node of the plurality of computing nodes and the number of the computing nodes in the plurality of the computing nodes.

* * * * *